May 13, 1941. G. J. THOMAS 2,242,096
HYDRAULIC BRAKE APPARATUS
Filed April 12, 1937
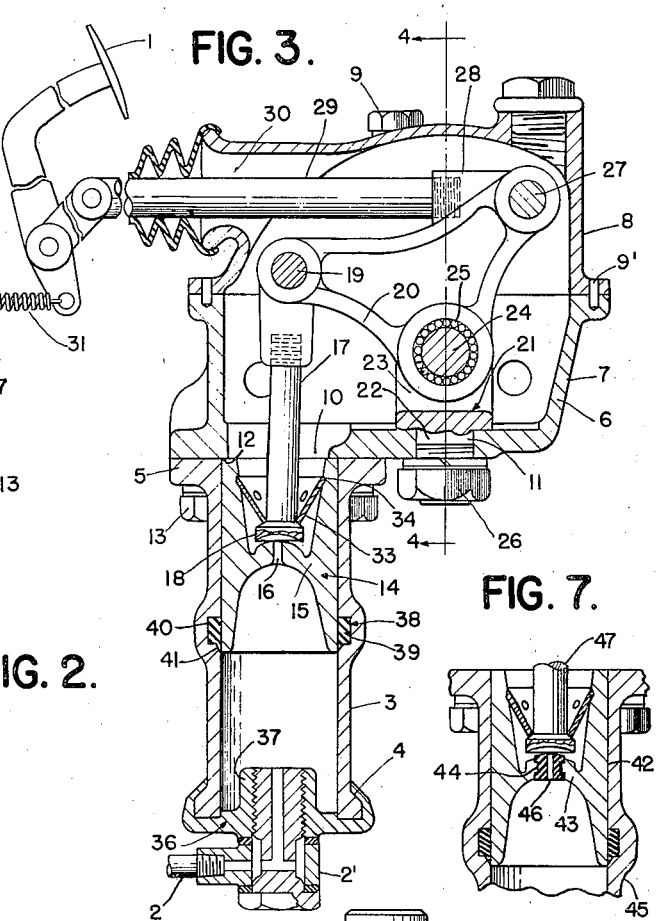
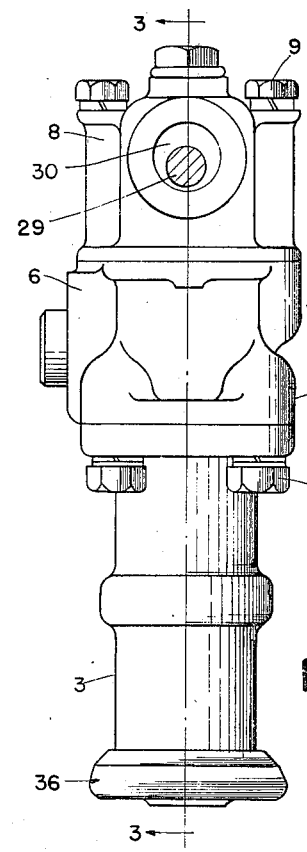
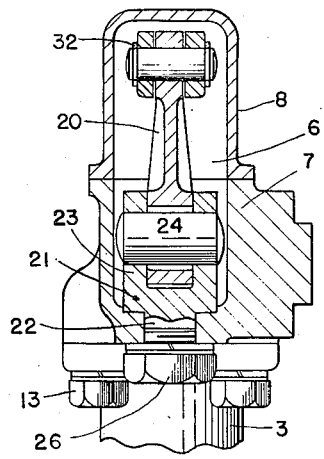
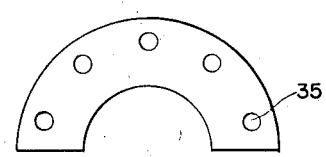
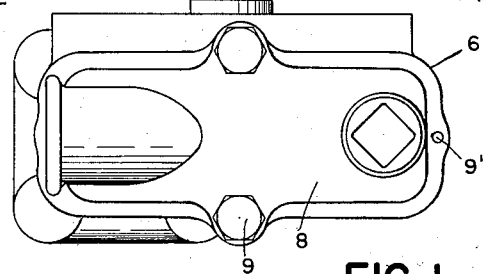
INVENTOR
GEORGE. JOSEPH. THOMAS
BY *Whittemore Hulbert Belknap,*
ATTORNEYS Patented May 13, 1941

2,242,096

UNITED STATES PATENT OFFICE 2,242,096

HYDRAULIC BRAKE APPARATUS

George Joseph Thomas, Birmingham, Mich.

Application April 12, 1937, Serial No. 136,467

5 Claims. (Cl. 60—54.6)

The invention relates to hydraulic brake apparatus and refers more particularly to hydraulic operators for actuating brakes of motor vehicles.

The invention has for one of its objects to provide an improved construction of hydraulic operator of that type having a cylinder and one or more pistons therein and provided with an improved effective seal. The invention has for another object to provide an improved construction of master cylinder which forms the hydraulic operator and which is constructed to automatically replenish the brake system with braking liquid. The invention has for further objects to so construct the master cylinder that its parts may be economically manufactured and assembled; to so construct the reservoir that it houses the device for actuating the piston rod from the manually operable member, such as the foot pedal; to provide an improved means for connecting the conduit between the wheel cylinders and the master cylinder to the latter; and to provide an improved retainer for securing the piston rod to the piston.

With these and other objects in view, the invention resides in the novel features of construction and combinations and arrangements of parts as more fully hereinafter set forth, reference being had to the accompanying description, claims and drawing, in which Figures 1 and 2 are respectively a plan view and an end view of a master cylinder showing an embodiment of my invention;

Figure 3 is a cross section on the line 3—3 of Figure 2;

Figures 4 and 5 are cross sections on the lines 4—4 and 5—5, respectively, of Figure 3;

Figure 6 is a plan view of the blank for forming the piston rod retainer;

Figure 7 is a view similar to Figure 3 showing a modification.

The hydraulic operator illustrated in the present instance is a master cylinder which is adapted to be actuated from a manually operable member, such as the foot pedal 1, and which is adapted to force braking liquid under pressure through the conduit 2 to the wheel cylinders for actuating the brakes of a motor vehicle. The master cylinder comprises a substantially vertical cylinder 3 having the flanged lower outlet end 4 and the flanged upper end 5. The master cylinder also comprises the braking liquid reservoir 6 which is above the cylinder 3 and communicates with its upper end, the arrangement being such that the braking liquid can flow by gravity into the cylinder. The reservoir 6 is formed of the lower section 7 and the upper section 8 suitably secured together by the bolts 9, dowels 9' being also preferably provided for assisting in locating the upper section on the lower. The lower section is adapted to contain the braking liquid and the two sections together are adapted to form a housing. The bottom wall of the lower section is provided with the openings 10 and 11 which may be formed at the same time by a drilling operation. The opening 10 is substantially concentric with the cylinder 3 but has a smaller diameter, so that the bottom wall forms the shoulder 12. The cylinder is secured to the bottom wall by suitable means, such as the bolts 13.

14 is the piston slidable within the cylinder 3. This piston has the transverse wall 15 intermediate its ends which is provided with the axial passageway 16 for the braking liquid. 17 is the piston rod for actuating the piston. This rod has the head 18 at its lower end which is adapted to contact with the transverse wall 15 of the piston and to close the passageway 16. The contacting surfaces of the wall and head are respectively convex and concave and the arrangement is such that during angular movement of the piston rod while it is being urged toward the piston to move the same on its work stroke, the head 18 slides over the transverse wall 15 and effectively seals the passageway 16 so that no braking liquid can pass therethrough at the time. The piston rod 17 extends upwardly within the reservoir and its upper end is connected by the pivot pin 19 to the lever 20. This lever, in effect, is a bell crank pivotally mounted upon the mounting 21 which has the stud 22 extending downwardly through the opening 11 in the bottom wall of the reservoir and the furcations 23 extending upwardly from the bottom wall and engaged by the pin 24 extending therebetween. The anti-friction bearings 25 are preferably provided around this pin and between the furcations for engagement with the lever 20. 26 is a nut threaded upon the stud 22 for rigidly securing the mounting in place. The other arm of the lever 20 is connected by the pivot pin 27 to the clevis 28 which in turn is connected to one end of the substantially horizontally extending rod 29, the other end of this rod being pivotally connected to the foot pedal 1. The upper section 8 of the reservoir is formed with the lateral opening 30 providing for passage of this rod. A suitable spring 31 normally holds the foot pedal in its retracted position. It will be noted that the side walls of the lower section 7 of the reservoir retain the pin 24 from becoming disengaged from the furcations 23 of the mounting. The pivot pins 19 and 27 are held from disengagement with the parts respectively engaged thereby by suitable means, such as the C clips 32, the arrangement being such that the ends of these pivot pins do not contact with the side walls of the upper section 8 of the reservoir.

The piston rod 17 is positively connected to the piston with a lost motion connection to move the piston during its work stroke and also to return the piston. The lost motion connection is provided so that during the return stroke of the piston the passageway 16 will be open so that the braking liquid may pass from the reservoir through the pasageway to the outlet end portion of the cylinder 3. This construction also provides for the passageway 16 remaining open when the piston and the piston rod are in their retracted positions, which are determined by contact of the upper end of the piston with the shoulder 12. For connecting the piston rod to the piston and providing for the necessary lost motion, there is the transversely split resilient annular retainer 33 having its edges closely adjacent each other when the retainer is in operative position. This retainer is frusto-conical in axial section with the larger end uppermost. The lower end engages the shoulder formed by the head 18 at the lower end of the piston rod, while the upper end engages a shoulder formed by the internal annular groove 34 formed in the piston near its upper end. The retainer is preferably provided with the annular series of holes 35 intermediate its upper and lower ends, which provide for flow of the braking liquid therethrough and also serve to increase the resiliency of the retainer. Furthermore, the holes may be used when applying or removing the retainer. This retainer is formed from the flat spring steel blank having a semi-circular shape, as illustrated in Figure 6. To apply the retainer, a suitable tool is engaged with the edge openings 35 to thereby collapse the retainer around the piston rod into a circular frusto-conical shape with the ends overlapping. While in this shape, the retainer is inserted into the upper end of the piston until its upper end snaps into engagement with the shoulder formed by the internal annular groove 34, after which the retainer expands so that its edges register with each other. To remove the retainer, the tool may be engaged with the edge holes and manipulated to overlap the edges of the retainer sufficiently to disengage the upper end of the retainer from the groove, after which the retainer may be withdrawn.

For connecting the conduit 2 to the lower outlet end of the cylinder 3, there is the cap 36, the periphery of which is crimped over the flanged outlet end 4 of the cylinder to form a tight seal therewith. This cap is provided with the central internally threaded hub 37 into which may be threaded the coupling 2' to which the conduit is secured.

For the purpose of providing an effective seal between the cylinder 3 and the piston 14 so that braking liquid cannot pass therebetween, I have provided the annular groove 38 in the wall of the cylinder between its upper and lower ends and also the packing ring 39 in this groove and closely or tightly engaging the cylinder and the piston. The packing ring is formed of a material which is relatively non-compressible and which may be distorted so that a portion thereof may be displaced. In the present instance, the material is rubber which may be either natural or synthetic. The annular groove 38 opens toward the piston and preferably has the major portion 40 of rectangular section and the minor portion 41 of triangular section, the latter portion being on the side of the major portion toward the pressure zone within the cylinder 3, or the outlet end portion thereof. The packing ring normally has a radial extent greater than that of the annular groove, the normal outer diameter of the ring being substantially the same as that of the groove and the normal inner diameter of the ring being less than that of the cylinder 3 so that the ring normally extends beyond the cylinder. The normal inner diameter of the ring is also less than the outer diameter of the piston. The length of the ring is substantially that of the major portion 40 of the groove. When the piston is assembled with the cylinder, the piston distorts the packing ring and displaces a portion thereof into the minor portion 41 of the groove to form a lip which extends toward the pressure zone of the cylinder. With this construction, the packing ring tightly engages both the cylinder and the piston and forms an effective seal.

While this construction of packing ring has been illustrated in a master cylinder, it is apparent that it is just as applicable to another form of hydraulic operator, such as a wheel cylinder.

Figure 7 illustrates a modified construction of piston 42 in which the transverse wall 43 intermediate its ends is provided with the bushing 44 having the axial passageway 46 through which the braking liquid passes to and from the outlet end portion of the cylinder 45. The bushing is preferably provided at its upper and lower ends with flanges which are set into the transverse wall and which serve to retain the bushing in place. The upper face of the upper flange is convex and preferably extends slightly above the upper convex face of the transverse wall. The bushing is formed of a material, preferably rubber, which is adapted to form an effective seal with the piston rod 47.

What I claim as my invention is:

1. In a hydraulic brake apparatus, a master cylinder comprising a reservoir for braking liquid having a pair of openings in one wall, a cylinder secured to said reservoir with one end communicating therewith through one of said openings, a piston in said cylinder having a passageway for the braking liquid, a rod for actuating said piston, said rod controlling said passageway and extending within said reservoir, an angularly movable lever within said reservoir for actuating said rod, and a mounting for said lever extending through the other of said openings and secured to said wall.

2. In a hydraulic brake apparatus, an upwardly extending cylinder, a braking liquid reservoir above the cylinder and communicating with the upper end thereof, a piston reciprocable in said cylinder and having in its upper end a recess terminating in a valve seat at the base of the recess formed with a passageway for the flow of liquid from the reservoir through the piston into the cylinder, a piston rod extending into the recess and having a valve head engageable with said seat to close said passageway, and a contractible coupling member of generally tubular construction having its opposite ends interposed between and engaging the valve head and upright wall of the recess at a point above the head for effecting a positive connection between the piston rod and piston while permitting a limited free movement of the valve head between said coupling member and valve seat.

3. In a hydraulic brake apparatus, an upwardly extending cylinder, a braking liquid reservoir above the cylinder and communicating with the upper end thereof, a piston reciprocable in said cylinder and having in its upper end a recess terminating in a valve seat at the base of the recess formed with a passageway for the flow of liquid from the reservoir through the piston into the cylinder, a piston rod extending into the recess and having a valve head engageable with said seat to close said passageway, and a contractible frusto-conical coupling member embracing the piston rod and interposed between the valve head and wall of the recess at a point above the head for effecting a positive connection between the piston rod and piston while permitting a limited free movement of the valve head between said coupling member and valve seat.

4. In a hydraulic brake apparatus, an upwardly extending cylinder, a braking liquid reservoir above the cylinder and communicating with the upper end thereof, a piston reciprocable in said cylinder and having in its upper end a recess terminating in a valve seat at the base of the recess formed with a passageway for the flow of liquid from the reservoir through the piston into the cylinder, a piston rod extending into the recess and having a valve head engageable with said seat to close said passageway, and a contractible coupling member of generally tubular construction having its opposite ends interposed between and engaging the valve head and upright wall of the recess at a point above the head for effecting a positive connection between the piston rod and piston while permitting a limited free movement of the valve head between said coupling member and valve seat, said coupling member being provided with a series of annularly arranged ports formed intermediate the ends of the member.

5. In a hydraulic brake apparatus, a master cylinder comprising a reservoir for braking liquid having a pair of openings in one wall, a cylinder secured to said reservoir with one end communicating therewith through one of said openings, a piston in said cylinder having a passageway for the braking liquid, a rod for actuating said piston, an angularly movable lever within said reservoir for actuating said rod, and a mounting for said lever extending through the other of said openings and secured to said wall.

GEORGE JOSEPH THOMAS.